United States Patent
Kano et al.

(10) Patent No.: US 11,390,708 B2
(45) Date of Patent: Jul. 19, 2022

(54) RESIN COMPOSITION FOR FIBER-REINFORCED COMPOSITE MATERIALS, AND FIBER-REINFORCED COMPOSITE MATERIAL USING SAME

(71) Applicant: NIPPON STEEL CHEMICAL & MATERIAL CO., LTD., Tokyo (JP)

(72) Inventors: Kyohei Kano, Tokyo (JP); Yuichi Taniguchi, Tokyo (JP)

(73) Assignee: NIPPON STEEL CHEMICAL & MATERIAL CO., LTD., Tokyo (JP)

(*) Notice: Subject to any disclaimer, the term of this patent is extended or adjusted under 35 U.S.C. 154(b) by 0 days.

(21) Appl. No.: 16/978,944

(22) PCT Filed: Feb. 25, 2019

(86) PCT No.: PCT/JP2019/006955
§ 371 (c)(1),
(2) Date: Sep. 8, 2020

(87) PCT Pub. No.: WO2019/171991
PCT Pub. Date: Sep. 12, 2019

(65) Prior Publication Data
US 2021/0054137 A1    Feb. 25, 2021

(30) Foreign Application Priority Data

Mar. 9, 2018  (JP) .............................. JP2018-042807

(51) Int. Cl.
C08G 59/62 (2006.01)
C08J 5/04 (2006.01)
C08J 5/24 (2006.01)

(52) U.S. Cl.
CPC ............ C08G 59/621 (2013.01); C08J 5/042 (2013.01); C08J 5/24 (2013.01); C08J 2363/00 (2013.01)

(58) Field of Classification Search
CPC . C08G 59/621; C08J 5/042; C08J 5/24; C08J 2363/00
USPC ....................................................... 523/205
See application file for complete search history.

(56) References Cited

U.S. PATENT DOCUMENTS 5,395,915 A * 3/1995 Iimuro ................... C08G 8/10
528/137
5,525,684 A * 6/1996 Kawabata ............... C08L 65/00
525/481
2008/0145667 A1 6/2008 Barker
2012/0156502 A1* 6/2012 Maejima ................ H05K 3/305
174/259
2014/0288214 A1 9/2014 Oka et al.
2015/0203628 A1 7/2015 Grunder et al.
2015/0240025 A1 8/2015 Grunder et al.
2016/0159690 A1* 6/2016 Dureault ............... C04B 40/065
156/71
2019/0119435 A1 4/2019 Asai et al.
2019/0233633 A1 8/2019 Taniguchi et al.

FOREIGN PATENT DOCUMENTS

| JP | 06100665 A | * | 4/1994 | ............ C08G 59/62 |
|---|---|---|---|---|
| JP | H06-287270 A | | 10/1994 | |
| JP | 2009-102563 A | | 5/2009 | |
| JP | 2009242719 A | * | 10/2009 | .............. C08G 8/10 |
| JP | 2015-535022 A | | 12/2015 | |
| JP | 2015-536373 A | | 12/2015 | |
| JP | 2016-098322 A | | 5/2016 | |
| WO | 2013/065516 A1 | | 5/2013 | |
| WO | 2017/179358 A1 | | 10/2017 | |
| WO | 2018/070470 A1 | | 4/2018 | |

OTHER PUBLICATIONS

Goto, JP 2009-242719 A machine translation in English, Oct. 22, 2009 (Year: 2009).*
Takashima et al., JP 06-100665 A machine translation in English, Apr. 12, 1994 (Year: 1994).*
International Preliminary Report on Patentability Chapter I dated Sep. 15, 2020, issued for PCT/JP2019/006955 and English translation thereof.

* cited by examiner

*Primary Examiner* — David T Karst
(74) *Attorney, Agent, or Firm* — Locke Lord LLP; James E. Armstrong, IV; Nicholas J. DiCeglie, Jr.

(57) ABSTRACT

The present invention has an object to provide a resin composition for fiber-reinforced composite materials that excels in rapid curability without impairing low viscosity and heat resistance. A two-component curable resin for fiber-reinforced composite materials is provided, which is configured of a base material including an epoxy resin (A) and a curing agent including an amine compound (B) selected from either norbornane diamine or triethylenetetramine and a phenol compound (C), and in which a mass ratio of the base material to the curing agent is within the range of from 90:10 to 70:30, and the phenol compound (C) includes a phenol compound including two or more phenolic hydroxyl groups and is contained at 5% by weight to 35% by weight in the curing agent. A fiber-reinforced composite material is obtained by mixing reinforcing fibers in the resin composition for fiber-reinforced composite materials.

9 Claims, No Drawings

RESIN COMPOSITION FOR FIBER-REINFORCED COMPOSITE MATERIALS, AND FIBER-REINFORCED COMPOSITE MATERIAL USING SAME

TECHNICAL FIELD

The present invention pertains to a resin composition for fiber-reinforced composite materials which is excellent in low viscosity and curability in a short time, and pertains to a fiber-reinforced composite material using the resin composition, and moreover pertains to a method for manufacturing a fiber-reinforced molded article using the composite material.

BACKGROUND ART

Fiber-reinforced composite materials are generally configured of reinforcing fibers such as glass fibers, aramid fibers, carbon fibers and the like and a thermally curable matrix resin such as an unsaturated polyester resin, a vinyl ester resin, an epoxy resin, a phenolic resin, a benzoxazine resin, a cyanate resin, a bismaleimide resin and the like. Since such composite materials are lightweight and excellent in mechanical properties such as strength, corrosion resistance, fatigue resistance and the like, they are widely used as structural materials for aircrafts, automobiles, civil engineering, sporting goods and the like.

Examples of methods for producing a fiber-reinforced composite material include an autoclave molding method or a press molding method using a prepreg obtained by impregnating reinforcing fibers in advance with a thermally curable matrix resin, a resin transfer molding method including a step of impregnating reinforcing fibers with a liquid matrix resin and a step of molding by thermal curing, a liquid compression molding method, a wet layup molding method, a pultrusion molding method, a filament winding molding method, and the like. Among them, a molding method such as a resin transfer method, in which impregnation and molding are carried out without using a prepreg, a low-viscosity matrix resin is used in order to promptly impregnate the reinforcing fibers with the resin.

In addition, the resin transfer molding method and liquid compression molding method require a matrix resin having a high curing rate after impregnating reinforcing fibers with the resin in order to ensure high productivity. Furthermore, these molding methods include a step of releasing the molded article from a die after curing, and in order to ensure high productivity, the matrix resin composition needs to have not only a high curing rate but also excellent demoldability.

Conventionally, thermally curable resins such as unsaturated polyester resins, vinyl ester resins, urethane resins, epoxy resins and the like have been used in the resin transfer molding method and liquid compression molding method. Although radically-polymerizable unsaturated polyester resins and vinyl ester resins are low in viscosity and excellent in rapid curability, a problem associated with such resins is that they have a large curing shrinkage at the time of molding, and mechanical properties such as heat resistance, strength and toughness of molded articles are relatively low. Although urethane resins are excellent in rapid curability and a molded article with high strength and toughness can be obtained, a problem associated with such resins is that the molded article has low heat resistance and high water absorption ratio. Although epoxy resins can provide molded articles with high heat resistance, strength and toughness, a problem is that a rapid curability thereof is poor.

In PTL 1, although efforts have been made to impart rapid curability to a resin composition by a combination of an epoxy resin and a specific phenol compound, the time to gelation is long, the rapid curability is insufficient, and the heat resistance is also inferior.

In PTL 2 and 3, although efforts have been made to impart rapid curability to a resin composition composed of an epoxy resin and a polyethylene polyamine by the addition of a specific catalyst, the time to gelation is long and the rapid curability is insufficient.

In PTL 4, although efforts have been made to impart rapid curability to a resin composition by a combination of an epoxy resin, a specific amine compound and a phenol compound, the rapid curability is still insufficient.

A matrix resin for fiber-reinforced composite materials needs to be excellent in low viscosity, and further improvements in rapid curability thereof are desired in order to ensure higher productivity without lowering the heat resistance.

CITATION LIST

Patent Literature

[PTL 1] JP 2016-098322 A
[PTL 2] JP 2015-535022 A
[PTL 3] JP 2015-536373 A
[PTL 4] WO 2017/179358 A

SUMMARY OF INVENTION

The present invention has an object to provide a resin composition for fiber-reinforced composite materials that excels in rapid curability without impairing low viscosity and heat resistance. The present invention has another object to provide a resin composition and a manufacturing method that make it possible to obtain fiber-reinforced composite materials and fiber-reinforced molded articles with high productivity.

As a result of studies conducted to solve the aforementioned problems, the inventors of the present invention have found that the aforementioned problems can be resolved by using a base material including a specific epoxy resin, and a curing agent including a specific amine compound and a phenol compound having a phenolic hydroxyl group. The present invention has been accomplished on the basis of this finding.

That is, the present invention provides a two-component curable resin for fiber-reinforced composite materials configured of a base material including an epoxy resin (A) and a curing agent including an amine compound (B) represented by a following formula (1) or (2) and a phenol compound (C), a mass ratio of the base material to the curing agent being within the range of from 90:10 to 70:30, wherein the phenol compound (C) includes a phenol compound including two or more phenolic hydroxyl groups and is contained at 5% by weight to 35% by weight in the curing agent.

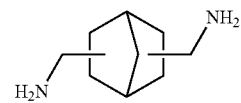

(1)

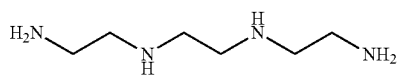

(2)

The phenol compound (C) is represented by a following general formula (3) and is preferably a phenol novolac configured to have a binuclear component content ratio of 17% by area or less, a trinuclear component content ratio of 38% by area or more, and a tetranuclear or higher nuclearity component content ratio of 45% by area or less in measurement by gel permeation chromatography.

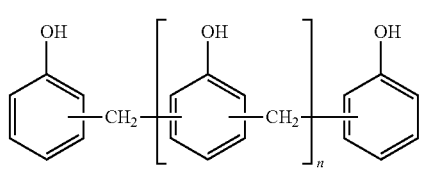

(3)

(In the formula, n represents an integer of 0 or more and is 0 to 5).

The curing agent preferably has a viscosity at 25° C. of 2,000 mPa·s or less. This viscosity is measured by an E-type viscometer.

A cured article that has been cured by heat-treating the resin composition for fiber-reinforced composite materials of the present invention at 120° C. for 5 min may have a glass transition temperature of 110° C. or higher.

Another aspect of the present invention pertains to a fiber-reinforced composite material in which reinforcing fibers are mixed in the resin composition for fiber-reinforced composite materials. In this case, the volume amount of the reinforcing fibers is preferably 45% to 70%.

The present invention also pertains to a method for manufacturing a molded article by molding the fiber-reinforced composite material by a resin transfer molding method or a liquid compression molding method.

Another aspect of the present invention is a method for manufacturing a molded article, comprising the steps of: preparing the abovementioned two-component curable resin composition for fiber-reinforced composite materials; mixing the two components of the curable resin composition for fiber-reinforced composite materials with reinforcing fibers to obtain a fiber-reinforced composite material; and then thermally curing and molding the fiber-reinforced composite material in a mold or die.

The resin composition for fiber-reinforced composite materials of the present invention has a low viscosity, a satisfactory impregnation property into reinforcing fibers, and a curability in a short time. Therefore, this resin composition for fiber-reinforced composite materials is suitable to be used for molding a fiber-reinforced composite material into a molded article by a resin transfer molding method or a liquid compression molding method. Further, the molded article obtained by curing is excellent in demoldability from a die and has a high glass transition temperature.

DESCRIPTION OF EMBODIMENTS

Embodiments of the present invention will be described hereinbelow in detail.

The resin composition for fiber-reinforced composite materials of the present invention is mixed with reinforcing fibers to form a fiber-reinforced composite material, and the fiber-reinforced composite material is cured or molded to obtained a cured product or a molded article. Hereinafter, the resin composition for fiber-reinforced composite materials is also referred to as a resin composition, and the fiber-reinforced composite material is also referred to as a composite material.

The resin composition of the present invention is a two-component curable resin composition composed of a base material including an epoxy resin (A) and a curing agent including an amine compound (B) represented by the formula (1) or (2) and a phenol compound (C). Here, the epoxy resin (A), the amine compound (C), and the phenol compound (C) are also referred to as a component (A), a component (B), and a component (C), or an epoxy resin, an amine compound, and a phenol, respectively.

As the epoxy resin (A) used as the main component, a bifunctional or higher functional epoxy resin is preferably used. Specific examples include bisphenol epoxy resins such as bisphenol A epoxy resin, bisphenol F epoxy resin, bisphenol E epoxy resin, bisphenol S epoxy resin, bisphenol Z epoxy resin, isophorone bisphenol epoxy resin, and the like; halogen or alkyl substitution and hydrogenation products, and also high molecular-weight materials having not only monomers but also a plurality of repeating units, and glycidyl ethers of alkylene oxide adducts of these bisphenol epoxy resins; novolac epoxy resins such as phenol novolac epoxy resin, cresol novolac epoxy resin, bisphenol A novolac epoxy resin, and the like; alicyclic epoxy resins such as 3,4-epoxy-6-methylcyclohexylmethyl-3,4-epoxy-6-methylcyclohexane carboxylate, 3,4-epoxycyclohexylmethyl-3,4-epoxycyclohexane carboxylate, 1-epoxyethyl-3,4-epoxycyclohexane, and the like; aliphatic epoxy resins such as trimethylolpropane polyglycidyl ether, pentaerythritol polyglycidyl ether, polyoxyalkylene diglycidyl ether, and the like; glycidyl esters such as phthalic acid diglycidyl ester, tetrahydrophthalic acid diglycidyl ester, dimer acid glycidyl ester, and the like; glycidyl amines such as tetraglycidyl diamino diphenyl methane, tetraglycidyl diamino diphenyl sulfone, triglycidyl aminophenol, triglycidyl aminocresol, tetraglycidyl xylylene diamine, and the like; and the like. These resins may be used singly or in combination of two or more thereof.

From the viewpoint of flowability, the epoxy resin preferably has a viscosity at 25° C. of 30,000 mPa·s or less. In the present description, the viscosity is measured by an E-type viscometer unless otherwise specified.

The amine compound (B) used as a curing agent component is norbornane diamine represented by the formula (1) or triethylenetetramine represented by the formula (2). By using these amine compounds, the rapid curability is improved. Norbornane diamine and triethylenetetramine may be used singly or in combination.

The phenol compound (C) used as yet another curing agent component is a phenol compound including two or more phenolic hydroxyl groups as functional groups in one molecule. When two or more such groups are included, the rapid curability is improved.

Specific examples of the phenol compound include bisphenol A, bisphenol S, bisphenol F, biphenol, bisphenol fluorene, 2,2-bis(4-hydroxy-3,5-dimethylphenyl)propane, 4,4'-methylenebis(2,6-dimethylphenol), 4,4'-methylenebis(2,6-di-tert-butylphenol), biscresolfluorene, phenol novolac, cresol novolac, hydroquinone, methylhydroquinone, dimethylhydroquinone, trimethylhydroquinone, tetramethylhydroquinone, isopropylhydroquinone, methyl-isopropylhydroquinone, mono-t-butylhydroquinone, di-t- butylhydroquinone, mono-t-amylhydroquinone, di-t-amylhydroquinone, nitrohydroquinone, phenylhydroquinone, diphenylhydroquinone, chlorohydroquinone, dichlorohydroquinone, trichlorohydroquinone, tetrachlorohydroquinone, bromohydroquinone, dibromohydroquinone, tribromohydroquinone, tetrabromohydroquinone, catechol, t-butylcatechol, resorcinol, pyrogallol, dinitropyrogallol, 1,2,4-benzenetriol, and the like. These may be used singly or in combination of two or more thereof as needed.

Among these, bisphenol A, bisphenol F, or phenol novolac is particularly excellent in terms of rapid curability and quality stability of the curing agent.

The phenol novolac is represented by the general formula (3) and is preferably phenol novolac configured to have a binuclear component content ratio of 17% by area or less, a trinuclear component content ratio of 38% by area or more, and a tetranuclear or higher nuclearity component content ratio of 45% by area or less in measurement by gel permeation chromatography (GPC). Here, the binuclear component means a component with n=0 in the general formula (3), the trinuclear component means a component with n=1 in the general formula (3), and the tetranuclear component means a component with n=2 in the general formula (3). When the binuclear component content ratio is 17% by area or less, the trinuclear component content ratio is 38% by area or more, and the tetranuclear or higher nuclearity component content ratio is 45% by area or less, the viscosity of the curing agent becomes too high and rapid curability can be exhibited without impairing the impregnability into the fibers.

The resin composition of the present invention is a two-component curable composition of a base material and a curing agent, and the curing agent including the amine compound and the phenol compound may optionally include other curing agent component, curing accelerator, or curing catalyst.

Moreover, a plasticizer, a dye, an organic pigment, an inorganic filler, a polymer compound, a coupling agent, a surfactant, a solvent, and the like can be appropriately blended as the other components with the base material and the curing agent. Other curable resins can also be blended. Examples of such curable resins include unsaturated polyester resins, curable acrylic resins, curable amino resins, curable melamine resins, curable urea resins, curable cyanate ester resins, curable urethane resins, curable oxetane resins, curable epoxy/oxetane composite resin and the like, and these examples are not limiting.

These resins can be blended with either of the base materials and the curing agent, depending on the reactivity with the components contained therein, viscosity and the like. Blends in which reaction proceeds with the components contained in the base material or curing agent need to be avoided. Further, since the solvent lowers the productivity of the molded article, it is desirable to include the solvent in a small amount or not to include at all.

Examples of other curing agent component, curing accelerator, and curing catalyst include tertiary amines, carboxylic acids, sulfonic acids, Lewis acid complexes, onium salts, imidazoles, alcohols, compounds having one phenolic hydroxyl group such as phenols, cresols, allylphenols, nitrophenols, para-aminophenol, meta-aminophenol, mono-t-butylphenol, di-t-butylphenol, and the like. These may be used singly or in combination or two or more thereof.

It is desirable that the curing agent include the phenol compound (C) in the range of 5% by mass to 35% by mass. Where the amount of the phenol compound is too low, rapid curability is not sufficiently exhibited. Meanwhile, where the amount of the phenol compound is too high, the viscosity of the curing agent will be too high and the heat resistance will be reduced.

The amount of the amine compound (B) is preferably in the range of 65% by mass to 95% by mass.

The curing agent preferably has a viscosity at 25° C. of 2,000 mPa·s or less. Where the viscosity exceeds 2,000 mPa·s, sufficient impregnation into the reinforcing fibers becomes difficult. The lower limit of the viscosity is not particularly limited, and the lower the viscosity, the easier the injection and impregnation of the composition at the time of molding.

The resin composition of the present invention is a two-component curable composition including a base material and a curing agent, and can be heated and cured by mixing these at a predetermined ratio. The mixing ratio of the base material and the curing agent is determined by the types of the epoxy resin component in the base material and the curing agent component in the curing agent. Specifically, the mixing ratio is adjusted by calculating the ratio of the number of moles of epoxy groups contained in the entire epoxy resin component to the number of moles of active hydrogen contained in the curing agent component, and the mole ratio is in the range of 90:10 to 70:30. Within this range, the resulting cured resin product has excellent heat resistance and elastic modulus.

The cured product of the resin composition of the present invention that is obtained by heating at 120° C. for 5 min has a glass transition temperature (Tg) of preferably 100° C. or higher, and more preferably 110° C. or higher. When the Tg is lower than 100° C., the obtained cured product or molded article of the fiber-reinforced composite material is likely to be deformed when released from the mold.

The reinforcing fibers to be used for the fiber-reinforced composite material of the present invention are selected from glass fibers, aramid fibers, carbon fibers, boron fibers and the like, but in order to obtain a fiber-reinforced composite material having excellent strength, carbon fibers are preferably used.

The fiber-reinforced composite material of the present invention includes the resin composition and reinforcing fibers. The volume content ratio of the reinforcing fibers in the fiber-reinforced composite material is preferably in the range of 45% to 70%, and more preferably 48% to 62%. Within this range, a molded body having fewer voids and a high volume content ratio of reinforcing fibers can be obtained, so that a molded material with excellent strength can be obtained.

The fiber-reinforced composite material is preferably cured by injecting the base material at a temperature in the range of 50° C. to 90° C. and the curing agent at a temperature in the range of 20° C. to 60° C. into a mold or die or the like in which fibers have been previously arranged, and heating and curing at a temperature of 90° C. to 160° C., preferably 100° C. to 140° C., for 15 sec to 360 sec, preferably 25 sec to 150 sec. The base material and the curing agent may be injected into the mold or die at the same time, but in order to improve the uniformity, it is desirable to mix them immediately before the injection. However, the base material and the curing agent may be injected into the mold or die without mixing and mixed in the presence of fibers. The mixing method is not particularly limited, and a collision mixing method, a static mixer method, and the like may be used, but a collision mixing method in which uniform mixing is completed in a short time is preferable.

A low injection temperature is undesirable because flowability decreases and the molding die and fibers are not filled satisfactorily. A high injection temperature is also undesirable because burrs are generated, or curing of the resin starts at the time of injection, so that the resin is cured in the tank or in the molding die and filling defects occur. Furthermore, it is undesirable that the molding time be too short because sufficient filling cannot be achieved, or too long because the resin is cured in the mold, molding defects occur and productivity decreases. The resin composition contained in the fiber-reinforced composite material of the present invention can be injected and impregnated into a die at a relatively low injection temperature such as described above, and a cured product that can be released from the mold or die in a short curing time can be obtained.

The method for manufacturing the fiber-reinforced composite material or the molded article from the resin composition of the present invention is not particularly limited, but the RTM method or the LCM method is preferable. In the RTM method, a fiber material or a preform made of reinforcing fibers is placed in a molding die, a liquid resin composition for fiber-reinforced composite materials is injected into the molding die and impregnated into reinforcing fibers to obtain a fiber-reinforced composite material, and then heating is performed to cure the fiber-reinforced composite material and obtain a molded body. As the curing conditions, the conditions described in relation to the curing of the resin composition for fiber-reinforced composite materials are suitable. In the LCM method, a fiber material or a preform made of reinforcing fibers which has been mixed with a resin in advance is set in a molding die in a state in which the molding pressure is released, the impregnation and molding are simultaneously performed by clamping the molding die to obtain a reinforced composite material, and the molding die is thereafter heated to cure the fiber-reinforced composite material and obtain a molded body. The conditions described above in relation to curing of the resin composition for fiber reinforced composite materials are suitable as the curing conditions for the LCM method.

EXAMPLES

Next, the present invention will be specifically described based on examples, but the present invention is not limited to the following examples, provided that the gist of the present invention is not impaired. Unless otherwise specified, the parts indicating the mixed amount are parts by mass.

The abbreviations for the components used in the examples and comparative examples are as follows.
YD-128: Bisphenol A type epoxy resin (manufactured by NIPPON STEEL Chemical & Material CO., LTD.)
YDF-170: Bisphenol F type epoxy resin (manufactured by NIPPON STEEL Chemical & Material CO., LTD.)
TETA: Triethylenetetramine
NBDA: Bis(aminomethyl)norbornane
1,3-BAC: 1,3-Bisaminomethylcyclohexane
BPA: Bisphenol A
BPF: Bisphenol F
4tBP: 4-tert-Butylphenol Synthesis Example 1

A total of 100 parts of bisphenol F having a binuclear amount of 90% by area as bisphenol F and 600 parts of phenol were added in a stirring tank reactor equipped with a stirrer, a temperature controller, a reflux condenser, a total compressor, a decompressor, and the like, the temperature was raised to 80° C., then 1.55 parts of oxalic acid dihydrate was added and dissolved by stirring for 10 min, and then 115 parts of 37.5% formalin was added dropwise over 30 min. Then, the reaction was continued for 3 hours while maintaining the reaction temperature at 92° C. After completion of the reaction, the temperature was raised to 110° C., dehydration was performed, about 90% of the remaining phenol was recovered under the recovery conditions of 150° C. and 60 mmHg and then recovered under the recovery conditions of 160° C. and 5 mmHg, and then 10 parts of water was added dropwise over 90 min under the conditions of 160° C. and 80 mmHg to remove residual phenol and obtain a crude phenol novolac resin. The composition of the obtained crude phenol novolac resin had a dinuclear component amount of 55.1% by area, a trinuclear component amount of 24.9% by area, a tetranuclear component amount of 11.1% by area, a pentanuclear component amount of 5.0% by area, and a hexanuclear or higher nuclearity component amount of 3.9% by area, the Mw was 339, and the dispersity (Mw/Mn) was 1.190.

The crude phenol novolac resin obtained above was continuously fed for 1 hour at 21 kg/h to a centrifugal thin-film evaporator operated at a rotor rotation speed of 250 rpm and a vacuum degree of 3 to 5 mmHg, and the evaporated component and phenol novolac resin were continuously extracted. The centrifugal thin-film evaporator was equipped with a jacket, the heating surface was 0.21 m$^2$, and a heating medium of 260° C. was flown through the jacket. Further, the centrifugal thin-film evaporator had an external condenser, the cooling surface was 1.3 m$^2$, heated water at 120° C. was caused to flow, and the entire amount of evaporated component was condensed and extracted.

The composition of the obtained phenol novolac resin had a dinuclear component amount of 9.1% by area, a trinuclear component amount of 48.9% by area, a tetranuclear component amount of 22.9% by area, a pentanuclear component amount of 10.4% by area, and a hexanuclear or higher nuclearity component amount of 8.7% by area, the Mw was 423, and the dispersity (Mw/Mn) was 1.122. In the evaporated component, a dinuclear component amount was 97.9% by area, a trinuclear component amount was 2.1% by area, the Mw was 203, and the dispersity (Mw/Mn) was 1.006. No coloring was observed in the obtained phenol novolac resin. This phenol novolac is assigned with a name of PN-1.

The measurement or test method of each physical property is described hereinbelow.

(Measurement of Molecular Weight Distribution)

A configuration in which a column (manufactured by Tosoh Corporation, TSKgelG4000HXL, TSKgelG3000HXL, TSKgelG2000HXL) was provided in series with a GPC main body (manufactured by Tosoh Corporation, HLC-8220GPC) was used, the column temperature was set to 40° C., tetrahydrofuran was used as an eluent, the flow rate was set to 1 ml/min, the measurement was performed using an RI (differential refractometer) detector, and the dinuclear component content ratio, trinuclear component content ratio, and n=1 component content ratio were determined from the area % of peaks.

(Measurement of Curing Agent Viscosity)

Measurement was performed at 25° C. using an E-type viscometer cone plate type (manufactured by Toki Sangyo Co., Ltd.: RE80H). The value after 60 sec from the start of measurement was taken as the viscosity value.

(Measurement of Gelation Time)

The two-component curable resin composition was added onto the plate of a gelation tester (manufactured by Nissin Kagaku Kenkyusho Co., Ltd.) which had been heated to 120° C., the mixture was stirred at a speed of 2 revolutions per second using a fluororesin rod, and the time required for the resin composition to cure and lose plasticity was taken as the gelation time.

(Measurement of Glass Transition Temperature)

Using a dynamic viscoelasticity tester, the measurement was performed on a test piece for glass transition temperature measurement under conditions of a heating rate of 5° C./min, a bending mode, and a measuring frequency of 10 Hz, and the maximum value of a loss elastic modulus (E") was taken as a glass transition temperature.

(CFRP Bending Test)

Using an autograph AGS-X (manufactured by SHIMADZU CORPORATION), a CFRP bending testpiece was measured by a method according to JIS K-7074, and a bending elastic modulus (GPa) and a maximum bending stress (MPa) were measured.

Example 1

A total of 100 parts of YD-128 as the component (A), 13.3 parts of TETA as the component (B), and 3.3 parts of BPA as the component (C) were used, and these were placed in a 150 mL polymer container and mixed under stirring at room temperature for 5 min to obtain a resin composition.

The resin composition was poured into a die, heated to 120° C. and having a length of 60 mm and a width of 80 mm and moreover provided with a 4 mm thick spacer hollowed out into a flat plate shape, and then cured for 5 min, and the obtained cured product was cut to a size of 50 mm×10 mm by using a table band saw to obtain a testpiece that was used for measurement of the glass transition temperature (Tg).

A carbon fiber woven fabric (fiber basis weight 300 g/m², 0° configuration, 6 ply) was impregnated with the obtained resin composition by hand lay-up molding to prepare a CFRP substrate. Subsequently, the CFRP substrate was placed on a die heated to 120° C., the die was closed and curing was performed for 5 min to obtain a CFRP test plate having a thickness of 2 mm. This CFRP test plate was cut to produce a CFRP bending test piece of 100 mm×15 mm×thickness of 2 mm. This was used for evaluation by the bending test of CFRP.

Examples 2 to 8 and Comparative Examples 1 to 6

Resin compositions and test pieces were prepared under the same mixing conditions as in Example 1 except that raw materials were used in compositions (parts) shown in Tables 1 and 2 as the components (A) to (C).

The formulations and test results of Examples 1 to 8 are shown in Table 1, and the formulations and test results of Comparative Examples 1 to 6 are shown in Table 2. The numerical values of the blending amounts are parts by mass.

TABLE 1

| Example | 1 | 2 | 3 | 4 | 5 | 6 | 7 | 8 |
|---|---|---|---|---|---|---|---|---|
| YD-128 | 100 | 100 | 100 | 100 | 100 | 100 | 80 | 100 |
| YDF-170 | | | | | | | 20 | |
| TETA | 13.3 | 13.3 | 13.3 | | | | 13.5 | |
| NBDA | | | | 21.0 | 21.0 | 21.0 | | 21.0 |
| BPA | 3.3 | | | 8.1 | | 2.8 | 3.4 | |
| BPF | | 3.3 | | | 8.1 | | | 8.4 |
| PN-1 | | | 3.3 | | | 4.2 | | |
| 4tBP | | | | | | | | 0.6 |
| Curing agent viscosity, mPa·s | 134 | 152 | 258 | 1,093 | 1,638 | 1,426 | 138 | 1,721 |
| Gel time, sec | 34 | 31 | 35 | 38 | 34 | 34 | 35 | 28 |
| Tg, °C. | 132 | 127 | 130 | 131 | 125 | 132 | 126 | 121 |
| Bending elastic modulus, GPa | 88 | 91 | 89 | 89 | 90 | 89 | 90 | 87 |
| Bending strength, MPa | 1,210 | 1,190 | 1,200 | 1,240 | 1,250 | 1,220 | 1,210 | 1,230 |

TABLE 2

| | Comparative example | | | | | |
|---|---|---|---|---|---|---|
| | 1 | 2 | 3 | 4 | 5 | 6 |
| YD-128 | 100 | 100 | 100 | 100 | 100 | 100 |
| TETA | 13.3 | | 13.3 | 13.3 | 13.3 | |
| NBDA | | 21.0 | | | | |
| 1,3-BAC | | | | | | 19.3 |
| BPA | | | 13.3 | 0.41 | | |
| BPF | | | | | | 7.5 |
| 4tBP | | | | | 3.32 | |
| Curing agent viscosity, mPa·s | 22 | 20 | 2,122 | 67 | 85 | 1,601 |
| Gel time, sec | 67 | 96 | 21 | 62 | 55 | 56 |
| Tg, °C. | 130 | 149 | 109 | 127 | 108 | 119 |
| Bending elastic modulus, GPa | 90 | 89 | 86 | 91 | 87 | 87 |
| Bending strength, MPa | 1,200 | 1,210 | 1,180 | 1,200 | 1,170 | 1,200 |

The bending strength of the CFRP is almost the same, but in the examples, the moldability and rapid curability are excellent, so the productivity is high and the heat resistance is also excellent.

The invention claimed is:

1. A two-component resin composition for fiber-reinforced composite materials configured of a base material including an epoxy resin (A) and a curing agent including an amine compound (B) represented by a following formula (1) or (2) and a phenol compound (C), a mass ratio of the base material to the curing agent being within the range of from 90:10 to 70:30, wherein the phenol compound (C) includes a phenol compound including two or more phenolic hydroxyl groups and is contained at 5% by weight to 35% by weight in the curing agent:

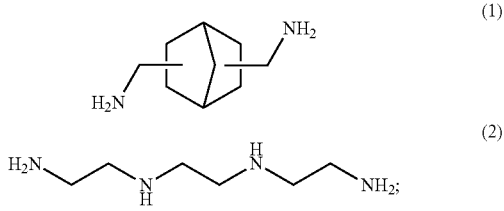
(1)

(2)

and wherein the phenol compound (C) is represented by a following general formula (3) and is a phenol novolac configured to have a binuclear component content ratio of 9.1%-17% by area, a trinuclear component content ratio of 38% by area or more, and a tetranuclear or higher nuclearity component content ratio of 22.9%-45% by area in measurement by gel permeation chromatography:

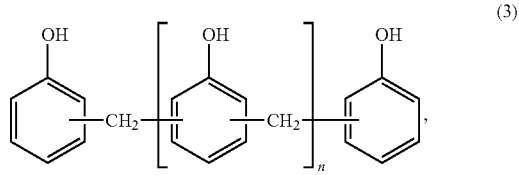
(3)

in the formula, n represents an integer of 0 to 5.

2. The resin composition for fiber-reinforced composite materials according to claim 1, wherein the curing agent has a viscosity at 25° C. of 2,000 mPa·s or less as measured by an E-type viscometer.

3. The resin composition for fiber-reinforced composite materials according to claim 1, wherein a cured product obtained by curing the resin composition for fiber-reinforced composite materials by heat-treating at 120° C. for 5 min has a glass transition temperature of 110° C. or higher.

4. A fiber-reinforced composite material in which reinforcing fibers are mixed in the resin composition for fiber-reinforced composite materials according to claim 1.

5. The fiber-reinforced composite material according to claim 4, wherein a volume content ratio of the reinforcing fibers is 45% to 70%.

6. The fiber-reinforced composite material according to claim 5,
wherein the reinforcing fibers are carbon fibers;
wherein the curing agent has a viscosity at 25° C. of 2,000 mPa·s or less as measured by an E-type viscometer; and
wherein a cured product obtained by curing the resin composition for fiber-reinforced composite materials by heat-treating at 120° C. for 5 min has a glass transition temperature of 110° C. or higher.

7. A cured product of the fiber-reinforced composite material according to claim 4.

8. A method for manufacturing a molded article by molding the fiber-reinforced composite material according to claim 4 by a resin transfer molding method or a liquid compression molding method.

9. A method for manufacturing a molded article comprising the steps of:
preparing the two-component curable resin composition for fiber-reinforced composite materials according to claim 1;
mixing two components of the curable resin composition for fiber-reinforced composite materials with reinforcing fibers to obtain a fiber-reinforced composite material; and
then thermally curing and molding the fiber-reinforced composite material in a mold or die.

* * * * *